UNITED STATES PATENT OFFICE 2,259,925

MANUFACTURE OF COMPOUNDS OF THE HYDROURACIL SERIES

Otto Dalmer, Claus Diehl, and Hartmann Pieper, Darmstadt, Germany, assignors to Merck & Co. Inc., Rahway, N. J., a corporation of New Jersey No Drawing. Application January 18, 1939, Serial No. 251,598. In Germany January 3, 1933

13 Claims. (Cl. 260—260)

This invention relates to new hydrouracil compounds and their manufacture, and has for its main object the provision of new and useful soporifics or narcotics.

The present application is a continuation-in-part of our prior application S. N. 171,480, filed October 28, 1937, which in turn is a continuation-in-part of our Patent 2,098,954, filed January 3, 1934, issued November 16, 1937.

Soporifics consisting of or containing compounds of the heterocyclic series with an amide-like structure are known. The most important of these compounds are the barbituric acids, substituted by two hydrocarbon radicals in the 5-position, and their derivatives obtained by N-alkylation. Also disubstituted hydantoine compounds have been employed as soporifics.

We have produced a new class of soporifics in hydrouracil compounds of the general formula

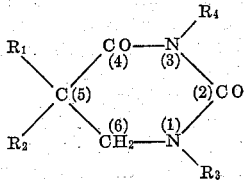

in which $R_1$ and $R_2$ are aliphatic, alicyclic or aromatic hydrocarbon radicals and $R_3$ and $R_4$ either hydrogen or hydrocarbon radicals. Whereas the known hydrouracil itself and its substitution products, obtained by monoalkylation in the 5- or 6-position are indifferent substances, we have found that hydrouracils, substituted by two hydrocarbon radicals in the 5-position, are strong and effective soporifics, which is also the case with their derivatives, obtained by substitution in the 1- or 3-position. Generally speaking the products substituted at the nitrogen atom have from physical and pharmacological aspects certain advantages over the products substituted only at the carbon atom. Of special interest are the compounds in which one of the substituents in the 5-position is phenyl.

Certain members of the new class of soporifics are similar to diethylbarbituric acid with respect to their soporific action, but have greater therapeutic scope. Still more important is the fact that certain of the new soporifics have a high degree of solubility, which is a great advantage over soporifics of the barbituric acid group and over most of the known soporifics.

According to the methods described in our application hereinbefore identified the new compounds belonging to the new class of soporifics are obtained by first reacting esters or amides of β-aminopropionic acid, disubstituted by hydrocarbon radicals in α-position to the carboxyl group and having at least one hydrogen atom in the amino and amido group, with derivatives of carbonic acid. Ureido or urethano compounds are thus obtained, which are converted by ring formation into the respective hydrouracil derivatives by treatment with alkaline condensing agents. Especially suitable condensing agents are the alkali metal alcoholates, especially sodium ethylate. Other condensing agents usual for ring formation in the barbituric acid series, such as sodium amide, may however also be employed.

We have also found that these new hydrouracil derivatives from aminopropionic acid derivatives may be obtained by a one-step process. Thus for example, hydrouracil derivatives may be directly obtained by treating amides of β-aminopropionic acid, disubstituted by hydrocarbon radicals in α-position to the carboxyl group, and having at least one hydrogen atom in the amino and amido group, with esters of carbonic acid in the presence of the condensing agents mentioned above. This reaction may be illustrated by the following formula:

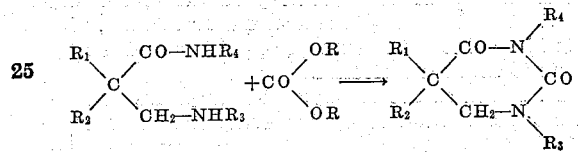

For the production of the derivatives which are methyl-substituted at nitrogen atom 3, the methyl amide of α-aminopropionic acid substituted by two hydrocarbon radicals in α-position to the carboxyl group is especially suitable. The preferred ester of carbonic acid for the reaction described is the ethyl ester which may be easily obtained.

For the derivative substituted by methyl at nitrogen atom 1, the ethyl ester of β-methyl aminopropionic acid disubstituted by hydrocarbon radicals in α-position to the carboxyl group may be employed. In preparing the hydrouracil compounds substituted by at least one phenyl radical in position 5, derivatives of ethyl phenylcyanoacetic acid may be employed. Thus, for example, for the production of 1-methyl-5-ethyl-5-phenyl hydrouracil, the ethyl ester of ethyl phenylcyanoacetic acid may be used as starting material and is hydrogenated to the corresponding ethyl ester of β-amino-α-ethyl-α-phenylpropionic acid, which is then further treated for the production of the 1-methyl-5-ethyl-5-phenyl hydrouracil.

In the preparation of 3-methyl-5-ethyl-5-phenyl hydrouracil, the methyl amide of phenylcyanoacetic acid is used as starting material and is converted to the corresponding methyl amide of β-amino-α-ethyl-α-phenylpropionic acid, which is then further treated for the production of 3-methyl-5-ethyl-5-phenyl hydrouracil.

The processes and products herein described are fully illustrated by the accompanying examples.

*Examples*

I. 109 g. of the ethyl ester of ethylphenylcyanocetic acid are dissolved in 800 ccm. of alcohol. 50 ccm. of 37% hydrochloric acid are added and the mixture is hydrogenated in presence of platinum oxide at 75° C. and 40 atmospheres pressure. After about 45 minutes hydrogenation the alcohol is distilled off, the residue dissolved in water and the solution extracted with petroleum ether to remove mono-hydrogenated ester. On addition of sodium hydroxide to the aqueous extraction residue the ethyl ester of β-amino-α-ethyl-α-phenylpropionic acid separates. The ester is taken up with ether and dried with potassium hydroxide. After evaporation of the ether the ester distills over at 150–151° (11 mm. Hg). The ester is converted into the ester of β-methylamino-α-ethyl-α-phenylpropionic acid by cautious methylation, said product boiling at 154° (12 mm. Hg).

235 g. of said ester are exactly neutralized with 500 ccm. of twice normal hydrochloric acid, a concentrated aqueous solution of 85 g. of potassium cyanate is added, and the mixture is heated to about 50° C. for a short time. The corresponding ureido ester separates in form of an oil, which soon solidifies. Melting point 106–107° C. By boiling the ester for about one hour with a solution of 23 g. of sodium in 400 ccm. of alcohol 1-methyl-5-ethyl-5-phenyl hydrouracil is formed. The alcohol is distilled off and the residue neutralized with diluted hydrochloric acid. Small white crystals precipitate, melting at 184.5° after recrystallization with alcohol, difficultly soluble in water and ether and easily soluble in warm alcohol.

II. 174 g. of the methylamide of phenylcyanoacetic acid, obtained by dissolving the ethyl ester of phenyl cyanoacetic acid in aqueous solution of methylamine, and sucking off the methylamide crystalized after some hours and melting at 102° C., are dissolved in 400 ccm. of absolute alcohol and reacted in the usual manner with 115 g. of ethylbromide and a solution of 23 g. of sodium in 400 ccm. of absolute alcohol. The alcohol is distilled off and the methylamide of ethylphenyl cyanoacetic acid obtained is recrystallized with ether, yielding colorless needles melting at 73° C.

200 g. of this methylamide are dissolved in 2 l. of alcohol, 100 ccm. of 37% hydrochloric acid are added and the mixture is treated with molecular hydrogen in presence of platinum oxide. When about the theoretical amount of hydrogen is taken up, hydrogenation is stopped and the alcohol distilled off. The remaining syrupy hydrochloride of the methylamide of β-amino-α-ethyl-α-phenylpropionic acid, containing only small amounts of unreacted starting material, is decomposed with sodium hydroxide solution and the free base obtained is dissolved in ether, the ethereal solution being dried with potassium carbonate. The methylamide formed by hydrogenation is precipitated as ether-insoluble sulfate from its solution by addition of a solution of concentrated sulfuric acid in cold ether, and thus separated from the non-hydrogenated starting material. The hydrochloride is easily soluble in ether and therefore not suitable for the separation. The methylamide of β-amino-α-ethyl-α-phenylpropionic acid made from the sulfate is a colorless viscous oil. Yield 195 g.

103 g. of this methylamide are dissolved in 250 ccm. of ether. A solution of 20 g. of sodium hydroxide in 200 ccm. of water and 55 g. of the ethyl ester of chloroformic acid are added while cooling. The ether is separated, the solution dried with potassium carbonate and distilled. The methylamide of β-carbethoxy-amino-α-ethyl-α-phenylpropionic acid remains as viscous colorless syrup. The yield is quantitative. This syrup is for about 2 hours boiled under reflux with a solution of 12 g. of sodium in 250 ccm. of absolute alcohol. The alcohol is distilled off at reduced pressure and ether and diluted hydrochloric acid are added to the residue. On concentrating the ethereal solution, 3-methyl-5-ethyl-5-phenyl hydrouracil crystallizes out in form of colorless prisms, melting at 136° C.

III. 28 g. of the amide of β-amino-α-diethylpropionic acid and 25 g. of diethyl carbonate are boiled for about 2 hours under reflux with a solution of 4.6 g. of sodium in 100 ccm. of absolute alcohol. The alcohol is distilled off at reduced pressure and the residue is taken up with water, neutralized with diluted hydrochloric acid, 5-diethyl hydrouracil is obtained in good yield by separating it from the solution.

IV. 31 g. of the methylamide of β-amino-α-diethyl-propionic acid and 25 g. of diethyl carbonate are boiled under reflux for about 3 hours with a solution of 4.8 g. of sodium in 100 ccm. of absolute alcohol. The alcohol is distilled off at reduced pressure; the residue is dissolved in water and ether and neutralized with diluted acid. On concentrating the ether solution, 3-methyl-5-diethylhydrouracil is obtained.

V. 18 g. of the amide of β-amino-α-methyl-α-phenyl-propionic acid and 15 g. of diethyl carbonate are boiled for about 2 hours under reflux with a solution of 2.4 g. of sodium in 100 cc. of absolute alcohol. The alcohol is distilled off at reduced pressure; the residue is taken up with water and neutralized with diluted hydrochloric acid. 5-methyl-5-phenylhydrouracil is filtered off by suction and recrystallized with alcohol in the form of a white powder, melting at 247°.

We claim:

1. A hydrouracil compound having the general formula

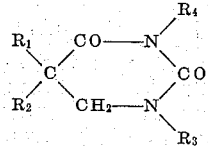

in which one of $R_1$ and $R_2$ is a lower alkyl radical and the other is phenyl, and $R_3$ and $R_4$ are selected from the group consisting of hydrogen and lower alkyl radicals, at least one of $R_3$ and $R_4$ being hydrogen.

2. A hydrouracil compound having the general formula

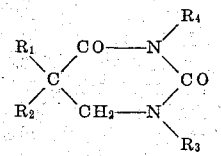

in which one of $R_1$ and $R_2$ is a lower alkyl radical and the other is phenyl, $R_3$ is hydrogen and $R_4$ is a lower alkyl radical.

3. A hydrouracil compound having the general formula

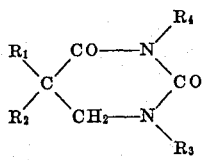

in which one of $R_1$ and $R_2$ is a lower alkyl radical and the other is phenyl, $R_3$ is a lower alkyl radical and $R_4$ is hydrogen.

4. A hydrouracil compound having the general formula

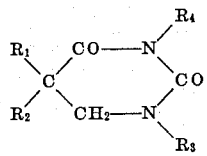

in which one of $R_1$ and $R_2$ is a lower alkyl radical and the other is phenyl, and $R_3$ and $R_4$ are selected from the group consisting of hydrogen and methyl, at least one of $R_3$ and $R_4$ being hydrogen.

5. 5-methyl-5-phenyl hydrouracil.

6. A process for producing hydrouracil compounds which comprises treating a compound having the formula

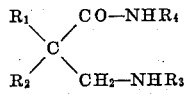

wherein $R_1$ and $R_2$ are selected from the group consisting of lower alkyl and phenyl radicals, at least one of $R_1$ and $R_2$ being lower alkyl and $R_3$ and $R_4$ are selected from the group consisting of hydrogen and lower alkyl radicals, with esters of carbonic acid and simultaneously with alkaline condensing agents to obtain directly the hydrouracil compounds.

7. A process for producing hydrouracil compounds which comprises treating a compound having the formula

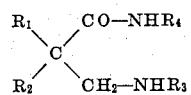

wherein $R_1$ and $R_2$ are selected from the group consisting of lower alkyl and phenyl radicals, at least one of $R_1$ and $R_2$ being lower alkyl, and $R_3$ and $R_4$ are selected from the group consisting of hydrogen and lower alkyl radicals, at least one of $R_3$ and $R_4$ being hydrogen, with esters of carbonic acid and simultaneously with alkaline condensing agents to obtain directly the hydrouracil compounds.

8. A process for producing hydrouracil compounds which comprises treating a compound having the formula

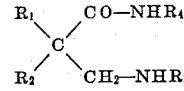

wherein $R_1$ and $R_2$ are selected from the group consisting of lower alkyl and phenyl radicals, at least one of $R_1$ and $R_2$ being lower alkyl, and $R_3$ and $R_4$ are selected from the group consisting of hydrogen and lower alkyl radicals, with diethyl carbonate and simultaneously with alkaline condensing agents to obtain directly the hydrouracil compounds.

9. A process for producing hydrouracil compounds which comprises treating a compound having the formula

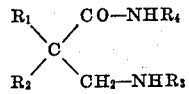

wherein $R_1$ and $R_2$ are selected from the group consisting of lower alkyl and phenyl radicals, at least one of $R_1$ and $R_2$ being lower alkyl, and $R_3$ and $R_4$ are selected from the group consisting of hydrogen and lower alkyl radicals, with esters of carbonic acid and simultaneously with alkali metal alcoholates to obtain directly the hydrouracil compounds.

10. A process for producing hydrouracil compounds which comprises treating a compound having the formula

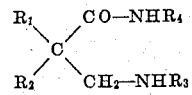

wherein $R_1$ and $R_2$ are selected from the group consisting of lower alkyl and phenyl radicals, at least one of $R_1$ and $R_2$ being lower alkyl, and $R_3$ and $R_4$ are selected from the group consisting of hydrogen and lower alkyl radicals, with esters of carbonic acid and simultaneously with sodium ethylate to obtain directly the hydrouracil compounds.

11. A process for producing hydrouracil compounds which comprises treating a compound having the formula

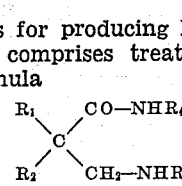

wherein $R_1$ and $R_2$ are selected from the group consisting of lower alkyl and phenyl radicals, at least one of $R_1$ and $R_2$ being lower alkyl, and $R_3$ and $R_4$ are selected from the group consisting of hydrogen and lower alkyl radicals, with diethyl carbonate and simultaneously with sodium ethylate to obtain directly the hydrouracil compounds.

12. A process for producing hydrouracil compounds which comprises treating a compound having the formula

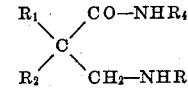

wherein $R_1$ is a lower alkyl radical, $R_2$ is phenyl, and $R_3$ and $R_4$ are selected from the group consisting of hydrogen and lower alkyl radicals, with esters of carbonic acid and simultaneously with alkaline condensing agents to obtain directly the hydrouracil compounds.

13. A process for producing hydrouracil compounds which comprises treating the amide of β-amino-α-methyl-α-phenyl-propionic acid with diethyl carbonate and simultaneously with sodium ethylate to obtain directly 5-methyl-5-phenyl-hydrouracil.

OTTO DALMER.
CLAUS DIEHL.
HARTMANN PIEPER.